United States Patent [19]

Nagai

[11] 4,278,143
[45] Jul. 14, 1981

[54] PARKING BRAKE RELEASE APPARATUS
[75] Inventor: Hiroshi Nagai, Iwata, Japan
[73] Assignee: Yamaha Hatsudoki Kabushiki Kaisha, Iwata, Japan
[21] Appl. No.: 110,673
[22] Filed: Jan. 9, 1980

Related U.S. Application Data

[63] Continuation of Ser. No. 955,305, Oct. 27, 1978, abandoned.

[30] Foreign Application Priority Data

Nov. 4, 1977 [JP] Japan .................................. 52-132224

[51] Int. Cl.³ ............................................ B60R 27/00
[52] U.S. Cl. ...................................... 180/282; 74/535; 74/539; 74/542; 188/111
[58] Field of Search ...................... 180/271, 275, 282; 188/110, 111; 74/512, 529, 532, 533, 535, 536, 539–542

[56] References Cited

U.S. PATENT DOCUMENTS

| 837,043 | 11/1906 | Discher | 74/542 |
|---|---|---|---|
| 3,997,019 | 12/1976 | Inoue | 188/110 X |

FOREIGN PATENT DOCUMENTS 4330330 of 0000 Japan .

Primary Examiner—John J. Love
Assistant Examiner—D. W. Underwood
Attorney, Agent, or Firm—Donald D. Mon

[57] ABSTRACT

Parking brake release apparatus for a vehicle of the type which has a frame, wheels, a parking brake for at least one of its wheels, a parking brake pedal pivotally mounted to the frame to apply the parking brake, the pedal having a braking and a brake release condition, a brake return opposing braking movement of the parking brake pedal, and an engine to provide driving power to at least one of the wheels. The engine when operating has a range of possible rotational frequencies (rpm). The release apparatus itself comprises a releasable lock adapted to lock the parking brake pedal in its braking condition. A lock release is adapted selectively to release the lock means and to prevent the lock means from locking. Engine frequency responsive means is connected to the lock release and adapted to permit the lock to become and remain locked at frequencies below a pre-selected frequency, and to release the lock if locked, and to prevent it from locking if unlocked, at frequencies at and above said pre-selected frequency. In the preferred embodiment, the engine frequency responsive means is a throw-weight governor type device.

8 Claims, 3 Drawing Figures

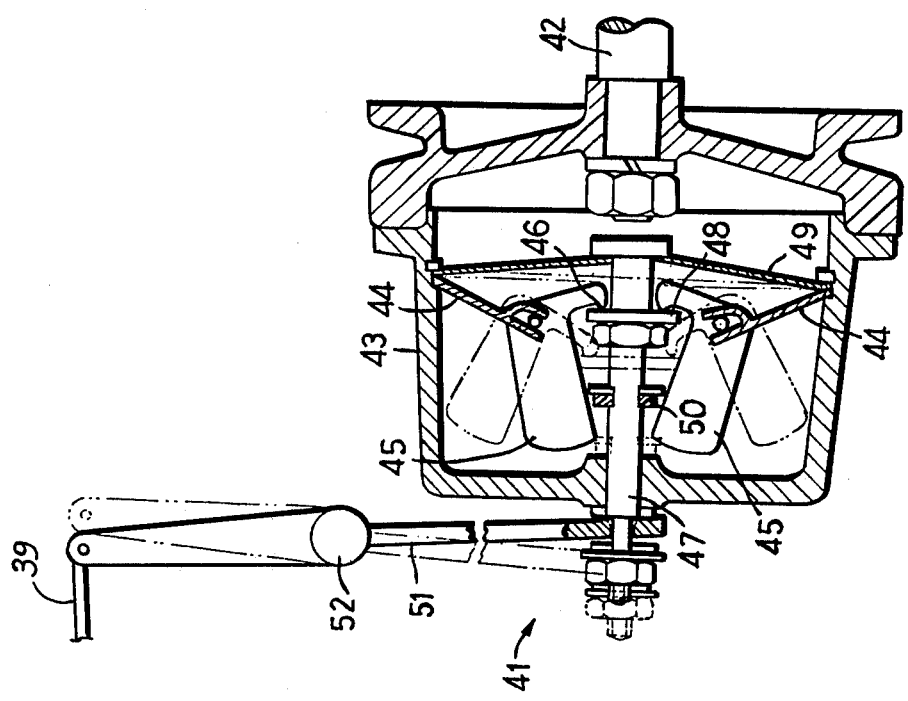

PARKING BRAKE RELEASE APPARATUS

CROSS-REFERENCE TO CO-PENDING APPLICATION

This is a continuation of appplicant's co-pending application, Ser. No. 955,305, filed Oct. 27, 1978, entitled "parking Brake Release Apparatus", now abandoned.

This invention relates to parking brakes for wheeled vehicles, and in particular to apparatus for automatically releasing a parking brake from its locked condition.

Generally, vehicles having more than three wheels are equiped with a parking brake in order to prevent the car from moving while the car is parked. However, it is not rare for the driver to work the accelerator pedal while still forgetting to release the parking brake when he starts the car into motion. In view of this, there is a need for an apparatus to automatically release the parking brake from its locked condition.

In the prior art, apparatus has been proposed which is responive to the displacement of the accelerator pedal by the driver to release the parking brake from its locked condition. With such a conventional apparatus, however, the engine frequency (rpm) of the engine is not necessarily increased to a level sufficient for the car to start to move when the parking brake is released. Particularly where the car is intended to start to run uphill on a sloping road, the parking brake may be released before the engine speed reaches a sufficient level, and there results a danger that the car may roll back on the sloping road because the speed of the engine required for the car to start to move is higher than that required for a flat road.

In view of the foregoing, the present invention has as one of its objects to provide a parking brake release apparatus which is adapted to release a parking brake lock only when the engine frequency reaches a pre-determined level so as to prevent the car from rolling back on a sloping road and also to maintain the parking brake unlocked even if the parking brake pedal is operated by the operator while the engine is operating at a sufficiently high frequency.

A brake release apparatus according to this invention is utilized in combination with a vehicle having a frame, wheels, a parking brake for a least one of the wheels, a parking brake pedal pivotally mounted to the frame to apply the parking brake, the pedal having a braking and a brake released condition, brake return means opposing braking movement of said parking brake pedal, and an engine to provide driving power to at least one of the wheels, the engine when operating having a range of possible rotational frequencies. The release apparatus itself comprises releasable lock means adapted to lock the parking brake pedal in its braking condition, lock release means adapted selectively to release the lock means and to prevent said lock means from locking, and engine-frequency responsive means connected to said lock means and adapted to permit said lock means to lock at frequencies below a pre-selected frequency, and to release said lock means if locked, and to prevent said lock means from locking if unlocked, at frequencies at and above said pre-selected frequency.

According to a preferred but optional feature of the invention, said lock means comprises a ratchet.

According to still another preferred but optional feature of the invention, the lock means comprises a lock arm pivoted to the parking brake pedal having ratchet means thereon and in which the lock release means is adapted to displace the said lock arm to release or prevent locking action.

The above and other features of this invention will be fully understood from the following detailed description and the accompanying drawings, in which:

FIG. 3 is an axial cross-section of a portion of the invention illustrated in FIG. 2.

Figure 1:
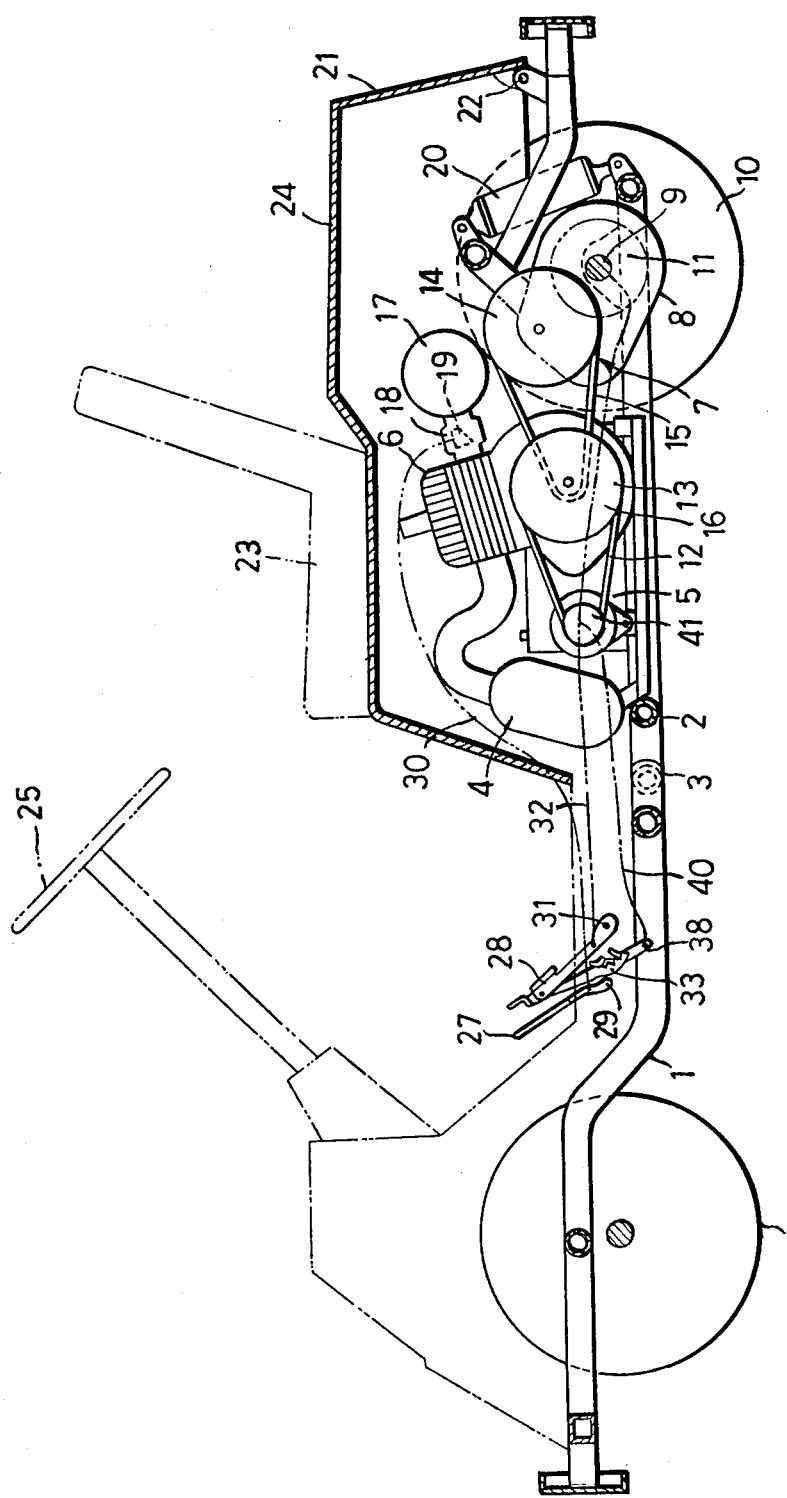
FIG. 1 is a side elevation partly in cutaway cross-section, showing the present invention.

In FIG. 1, a vehicle frame 1 of a golf car is shown. It is to be understood that the intended use of the vehicle does not constitute a limitation on the generality of this invention. The vehicle frame includes a swing arm 2 which is rockably mounted to the rear portion of frame 1 through a pivot shaft 3. A muffler 4, a starter motor 5, and an engine 6 are carried on the swing arm rearwardly in the order recited. A differential gear 8 is placed behind engine 6, and is coupled through a V-belt automatic transmission 7. The differential gear 8 is coupled to an axial 9 to which rear wheels (the drive wheels in this embodiment) 10 are attached. A brake 11 is mounted at rear wheels 10.

A starter motor 5 and engine 6 are coupled always through a V-belt 12 so that they can rotate as a unit with a pre-determined rotational ratio. Engine 6 and differential gear 8 are connected through the transmission 7, including an engine side drive pulley 13, a differential gear side driven pulley 14, and a V-belt 15 journaled on pulleys 13 and 14.

A governor is provided for reducing the width of the V-groove as the rotational frequency (sometimes referred to as rpm or engine speed) of the engine increases, or a mechanism 16 is provided for converting rotational movement into axial displacement in accordance with the rotational frequency so as to increase the wrapping diameter of the drive pulley 13. Under cranking conditions, when the rotational frequency is below the idling rotation frequency, the drive pulley 13 and the V-belt 15 do not engage. An air cleaner 17 and a carburetor 18 are provided for engine 6. The carburetor 18 includes a throttle valve 19.

A shock absorber 20 is interposed between the swing arm and the frame 1 to absorb and damp vibrations from swing arm 2.

Muffler 4, starter motor 5, the engine, transmission 7, and differential gear 8 are covered by a cowling 21 whose rear end is pivoted by hinge 22 to the rear end of frame 1. A seat 23 is placed on cowling 21 to provide a seat for the driver. A luggage carrier 24 is provided behind the seat for carrying golf bags or the like.

Front wheels 26 are adapted to be operated by steering wheel 25 and are mounted at the front of frame 1. An acclerator pedal 27 and a brake pedal 28 are disposed at the driver's feet. The accelerator pedal 27 is pivotally mounted by shaft 29 to frame 1 and is connected by means of rod or flexible wire 30 to throttle valve 19 of carburetor 18.

When the accelerator pedal 27 is pressed down, the throttle valve is opened to increase the rotational frequency of engine 6.

Brake pedal 28 is provided at one side of the accelerator pedal. Brake pedal 28 is shown in greater detail in FIG. 2. It is pivotally mounted (pivotal mounting is sometime referred to herein as "rotatable " mounting) by shaft 31 to frame 1, and is connected by a rod or flexible wire 32 to brake 11 so that the brake is actuated to arrest rotation of rear wheels 10 when the brake pedal is pressed down.

A lock arm 33 is rotatably mounted to brake pedal 28 by pivot shaft 34. Lock arm 33 is provided at its upper end with a pedal portion 35, and at its lower end with lock means in the form of a plurality of pawls 36 which are under certain circumstances engagable with a restraint means 37. Restraint means 37 is in the form of a latch member mounted to frame 1. A clothes-pin type spring 35a biases the lower end of the lock arm away from said restraint means. The term "releasable lock means" is sometimes used to describe elements 33–37, inclusive.

The releasable lock means also includes a displacement device 38 pivoted to the frame by pin 39 which is mounted to the frame. Release lever 38 is so disposed and arranged so that its free upper end abuts against the lower end of lock arm 33 so as to move its pawls 36 away from the lock pawl when the release lever 38 is rotated in the direction indicated by arrow A. The term "lock release means" is sometimes used to describe elements 38 and 39.

Figure 2:
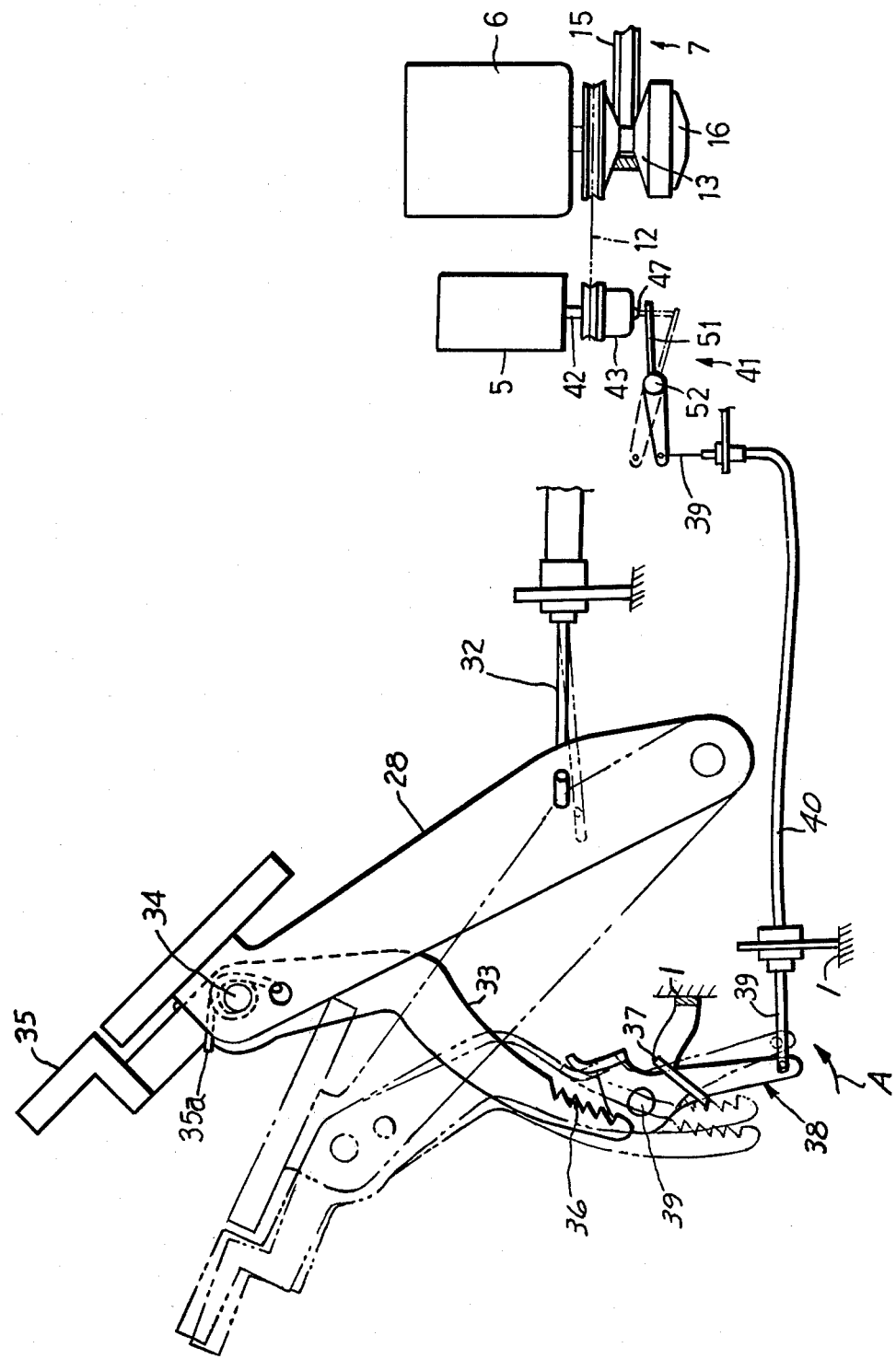
FIG. 2 is a view similar to FIG. 1 showing the invention in greater detail.

The other end of release lever 38 is connected by a flexible wire 39 to an engine-frequency responsive means 41 mounted to starter motor 5 (FIG. 2). As best shown in FIG. 3, a rotary case 43 is mounted as a unit to rotary shaft 42 of the starter motor 5. This is a throw-weight type device commonly known in the governor art. Centrifugal weights 45 (throw-weights) are rotatably supported by holding arms and are symmetrically arranged in case 43. Centrifugal weights 45 are pivoted to holding arms 44 in positions displaced from their center of gravity so that they rotate along the positions shown by the phantom lines when sufficient centrifugal forces are generated by rotation of the rotary case 43. Each of weights 45 is formed at one of its ends with a pusher 46 extending therefrom. Pusher 46 abuts against a flanged portion 48 of a sliding shaft 47 disposed on the line extending from rotary shaft 42.

Sliding shaft 47 is urged by means of a resilient member such as a dished spring member 49 whose periphery is suported by case 43 in the direction such that it is inserted in case 43. Sliding shaft 47 is biased out of case 43 by the action of pusher 46 in response to centrifugal forces of weights 45. Reference numeral 50 indicates limit stops for restricting the extent of projection of the sliding shaft 47. A pivoted lever 51 is rotatably connected to the end of the sliding shaft 47 and is pivoted at its intermediate portion to the frame. Flexible wire 39 is connected to the other end of lever 52.

The operation of the foregoing apparatus is as follows. When the parking brake pedal is pressed toward its braking position pedal portion 35 is also pressed down and the movement of the brake is opposed by brake return means (not shown). The pawls 36 will ratchet across the restraint means 37, with their engagement encouraged by the driver's foot against spring 35a. At engine frequencies less than the pre-selected frequency, this will cause a locking and will prevent the return of the brake pedal. Therefore the brake pedal will their hold the brake 11 in its braking state.

At this time if it is intended to operate the vehicle, the accelerator pedal may be depressed to turn on an ignition switch (not shown) and also to actuate the starter motor 5 and crank the engine 6. After engine 6 starts to run, the accelerator pedal is pressed further to increase the opening of throttle valve 19 of carburetor 18 so as to increase the amount of fuel supply to the engine, and according will increase the frequency of engine 6.

When the frequency of the engine is increased, the engine frequency responsive means which is mounted to starter motor 5 rotates along with engine 6 with a constant ratio. This is to say, when the rotary shaft 42 of the starter motor 5 rotates, rotary case 43 rotates along with rotary shaft 42 to provide centrifugal forces to centrifugal weights 45 so that the weights 45 move to the positions indicated by phantom lines (FIG. 3) at and above a pre-selected frequency. Under these circumstances pushers 46 of the centrifugal weight 45 push the flange portion of the sliding shaft 45 and move sliding shaft 47 from the end surface of the case 43 against the restraining force of spring member 49. Thus, lever 51 rotates to pull flexible wire 39 so as to rotate lever 38. When the rotational frequency of engine 6 reaches said pre-determined level, the amount of rotation of the lever 38 is sufficient so that the upper end of lever 38 pushes the lower end of arm 33 to disengage pawls 36 from restraint means 37. As a consequence, brake pedal 28 becomes free to return to its initial position and releases the brake from its braking condition.

In the drawings, the brake pedal is shown in solid line in its unlocked or non-braking condition. Also in FIG. 2 the parking brake lever is shown depressed (in phantom line), but with the lock means illustrated in two conditions. In the lower-most position of pedal 35, the pawls are engaged and the parking brake is locked. This is the condition when the engine is shut off or when it operates at less than the pre-determined speed. Under these circumstances, wire 39 is at its position shown in solid line and extended so that the upper portion of lever 38 is retracted away from arm 33. The other phantom-line position is that which occurs when the speed increases and lever 51 assumes its phantom line position which retracts the wire 39 and moves the upper end of lever 38 to displace lock arm 33 to the left so as to relieve the pawl from restraint means 37.

Thus, in accordance with the apparatus of the present invention, in which the parking brake is operated to prevent the car from moving when the engine is shut or when the engine frequency is below a pre-determined level, the parking brake will be automatically released when the rotational frequency reaches the pre-determined level and cannot then be locked, although it can be applied without being locked. This prevents overlooking the release of the parking brake when the vehicle begins to move under the impetus of an engine operating with a sufficient frequency. Additionally, since lock arm 33 is released only when the rotational frequency of engine 6 reaches the pre-selected level, the rotational frequency of engine 6 will be at a to sufficient level when the parking brake is released as to prevent backward movement of the car when it starts to run uphill on a sloping road.

It will also serve to prevent unlocking and downhill forward running on a slope when the engine is operating at lower frequencies.

Although pawl 36 of arm 33 tends to engage with restraint means 37 when brake pedal 28 pedal is pressed while the car is running, arm 33 and restraint means 37 cannot be placed in the locked condition even if the brake pedal is depressed, because the frequency of engine 6 while the car is running is higher than that which causes lock release and also the rotation frequency detecting means 41 holds release lever 38 displaced so as to prevent arm 33 from approaching and engaging pawl 37.

The present invention is not limited to the embodiment in which the lock arm 33 is pivotally mounted to the brake pedal, and in which the brake pedal is depressed when the parking brake is operated. The brake pedal and the lock means may be separately pivoted to the frame and respectively connected to brake 11 to obtain the same effect.

The engine frequency responsive means 41 need not be mounted to the starter motor. Instead, mechanism 41 may be mounted to governor 16 of the V-belt automatic transmission 7 or to any other member rotating with the engine 6 having a known and predetermined rotational ratio.

In accordance with the present invention, because the release means is moved in response to the engine frequency responsive means for automatically releasing the engagement between the lock arm and the restraint means and thereby to release the brake means from its braked condition when the frequency of the engine reaches a pre-determined level, and the release of the parking brake is determined only by the rotational frequency of the engine and is affected only when the rotation frequency is sufficient, there is no danger that the parking brake will be released and the car run free on a sloping road. Furthermore, because the rotation frequency of the engine in running operation is generally higher than that which is required to release the parking brake, and because the release means is maintained in its displaced position to prevent engagement of the locking means, there is no danger that the parking brake will become locked mistakenly, although it still remains possible to operate it without locking effect.

This invention is not to be limited by the embodiments shown in the drawings and described in the description which are given by way of example and not of limitation, but only in accordance with the scope of the appended claims.

I claim:

1. Brake release apparatus for a vehicle having a frame, wheels, a parking brake for at least one of said wheels, a parking brake pedal pivotally mounted to said frame to apply said parking brake, said pedal having a braking and a brake released condition, brake return means opposing braking movement of said parking brake pedal, an engine to provide driving power to at least one of said wheels, said engine when operating having a range of possible rotational frequencies, said release apparatus comprising: releasable lock means adapted to lock the parking brake pedal in its braking condition; lock release means adapted selectively to release said lock means and selectively to prevent said lock means from locking; and engine frequency responsive means connected to said lock release means and adapted to require said lock release means to permit said lock means to lock at frequencies below a pre-selected frequency, and to release said lock means if locked at frequencies at and above said pre-selected frequency, and to prevent said lock means from locking if unlocked at frequencies at and above said pre-selected frequency, all in direct and unique response to the frequency of said engine.

2. Brake release apparatus according to claim 1 in which said lock means comprises a ratchet.

3. Brake release apparatus according to claim 1 in which said lock means comprises a restraint means, a pivoted lock arm biased away from said restraint means, and in which said engine frequency responsive means includes a displacement device so disposed and arranged as to prevent engagement of the pivoted lock arm and restraint means at frequencies below said selected frequency.

4. Brake release apparatus according to claim 3 in which said lock arm is pivotally mounted to said brake pedal, and said restraint means is mounted to said frame.

5. Brake release apparatus according to claim 4 in which said displacement device is so disposed and arranged as to bear against and displace said lock arm relative to the brake pedal when the lock means is to be released.

6. Brake release apparatus according to claim 5 in which said displacement device is a pivoted lever.

7. Brake release apparatus according to claim 3 in which said engine frequency responsive means includes a throw-weight device actuating a push-pull cable, said push-pull cable actuating said displacement device.

8. Brake release apparatus according to claim 6 in which said engine frequency responsive means includes a throw-weight device actuating a push-pull cable, said push-pull cable actuating said displacement device.

* * * * *